(12) United States Patent
Clark

(10) Patent No.: US 8,773,390 B1
(45) Date of Patent: Jul. 8, 2014

(54) BIOMETRIC IDENTIFICATION DEVICES, METHODS AND SYSTEMS HAVING TOUCH SURFACES

(75) Inventor: Paul Gerald Clark, Bellvue, WA (US)

(73) Assignee: Cypress Semiconductor Corporation, San Jose, CA (US)

( * ) Notice: Subject to any disclaimer, the term of this patent is extended or adjusted under 35 U.S.C. 154(b) by 414 days.

(21) Appl. No.: 12/767,424

(22) Filed: Apr. 26, 2010

Related U.S. Application Data

(60) Provisional application No. 61/172,346, filed on Apr. 24, 2009.

(51) Int. Cl.
G06F 3/045 (2006.01)

(52) U.S. Cl.
USPC ............................ 345/174; 345/156; 345/173

(58) Field of Classification Search
USPC .................................................. 345/173–174
See application file for complete search history.

(56) References Cited

U.S. PATENT DOCUMENTS

| | | | |
|---|---|---|---|
| 6,941,001 B1* | 9/2005 | Bolle et al. | 382/124 |
| 7,587,072 B2* | 9/2009 | Russo et al. | 382/124 |
| 2005/0175225 A1* | 8/2005 | Shinzaki | 382/124 |
| 2007/0109274 A1* | 5/2007 | Reynolds | 345/173 |
| 2009/0027351 A1* | 1/2009 | Zhang et al. | 345/173 |
| 2010/0073302 A1* | 3/2010 | Ritzau et al. | 345/173 |

* cited by examiner

Primary Examiner — Christopher E Leiby

(57) ABSTRACT

A system may include a touch surface comprising a plurality of capacitance sensors; and processing circuits operable in a finger touch mode that detects finger touches as user input values, and biometric identification mode that detects a shape value of at least a portion of a user hand, and compares the shape value to stored biometric identification values.

19 Claims, 10 Drawing Sheets

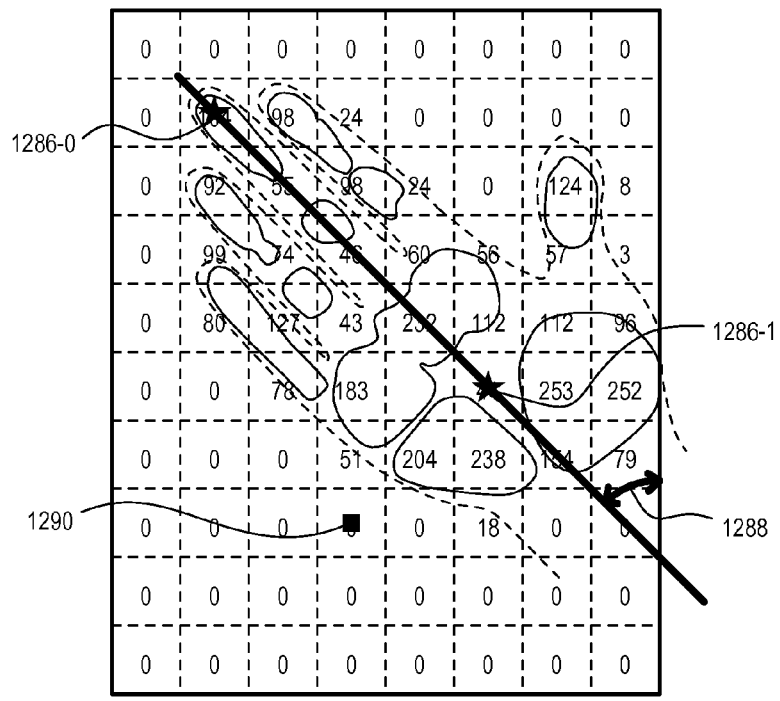
FIG. 12
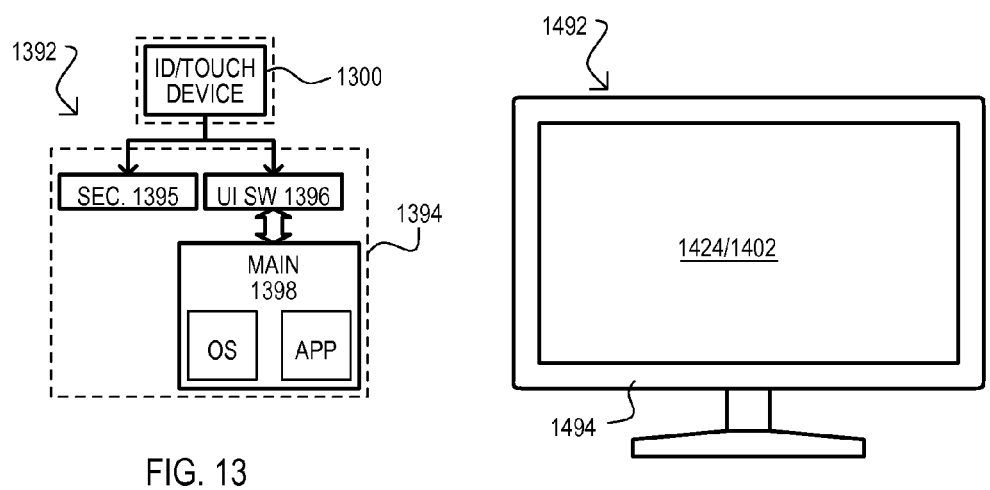
FIG. 13
FIG. 14

BIOMETRIC IDENTIFICATION DEVICES, METHODS AND SYSTEMS HAVING TOUCH SURFACES

This application claims the benefit of U.S. Provisional Patent Application Ser. No. 61/172,346, filed on Apr. 24, 2009, the contents of which are incorporated by reference herein.

TECHNICAL FIELD

The present disclosure relates generally to biometric identification systems, and more particularly to biometric identification systems having a touch surface.

BRIEF DESCRIPTION OF THE DRAWINGS

FIG. 12 is a diagram showing angle and position compensation operations that may be included in the embodiments.

FIG. 13 is a block schematic diagram of a system according to an embodiment.

FIGS. 14 to 17 are diagrams of various particular embodiments.

DETAILED DESCRIPTION

Figure 1:
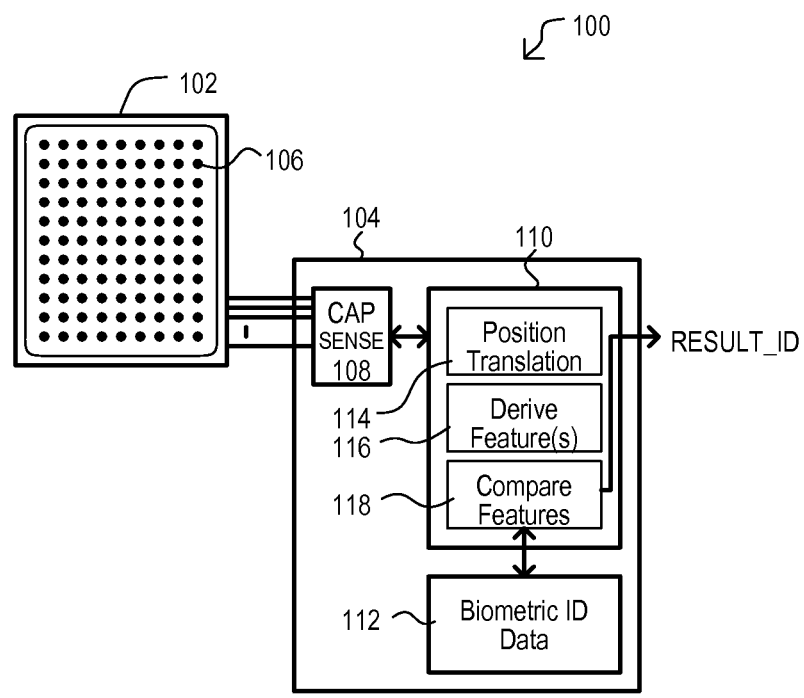
FIG. 1 is a block diagram of a device according to one embodiment.

Various embodiments will now be described that show devices, systems and methods for identifying a person based on values derived from two dimensional features of a body portion (e.g., length, width, area of portion(s) of a hand) in contact with a touch surface. Such two dimensional features are in contrast to systems that measure three dimensional body surface features (e.g., fingerprints). In very particular embodiments, a touch surface used for a biometric identification operation may also be used as a user input device.

In the particular embodiments shown below, like sections will be referred to by the same reference character but with the first digit(s) corresponding to the figure number.

Referring to FIG. 1, a device according to one embodiment is shown in a block diagram and designated by the general reference character 100. A device 100 may include a sense surface 102 and processing circuits 104. A sense surface 102 may include a number of sense locations (one shown as 106), each of which may detect the presence or absence of body part in contact with the touch surface 102, as well as the extent to which the body part is present (e.g., size or proximity of the body part). In one embodiment, a touch surface 102 has sufficient area to accommodate the body portion being measured. That is, a user does not "swipe" a hand or hand portion over the surface. Rather, the body part may be placed on the surface and maintained substantially motionless for the amount of time needed to acquire a measurement value at a set of sense locations (e.g., 106).

A sense surface 102 may derive body shape data in various ways, including but not limited to capacitance sensing or resistance sensing, or any other suitable method for detecting contact of the body part with the surface.

Processing circuits 104 may determine if a sensed body part matches stored biometric identification (ID) values to generate a match result (RESULT_ID). In the embodiment shown, processing circuits 104 may include sense circuit 108, processing section 110, and biometric data store 112. Sense circuits 108 may acquire sense values corresponding to sense locations (e.g., 106). In some embodiments sense circuits 108 may include analog-to-digital conversion circuits to convert analog sense values into digital values. In a particular embodiment, sense circuits 108 may be capacitance sense circuits that sense a capacitance value at each sense location (e.g., 106).

A processing section 110 may include a position translation section 114, a feature derivation section 116, and a feature comparison section 118. A position translation section 114 may compensate for angular and/or positional offsets between an orientation of a sensed body portion and an orientation corresponding to the biometric data.

A feature derivation section 116 may derive two dimensional measurements of a body portion sensed by sense locations (e.g., 106). As noted above, such measurements may correspond to a shape of a body portion. In some particular embodiments, a feature derivation section 116 may generate sensed biometric values corresponding to a shape of a body portion in contact with a sense surface, including but not limited to a width, length, diagonal, contact area, perimeter, and/or perimeter portion, including relative distances between such values. In a very particular embodiment, a sensed body portion may be a hand, and biometric values may measure any of: a finger, a finger portion, multiple fingers, a palm, a portion of a palm, and/or gaps between where portions of a hand contact a sense surface.

A comparison section 118 may compare sensed biometric values to stored biometric ID values. Based upon such a comparison, a result value RESULT_ID may be generated indicating whether or not a match has been determined, and to which of the stored ID values a match has occurred.

In one embodiment, sections 114, 116, 118 may be realized by one or more processors executing predetermined instructions with arithmetic logic circuits. However, in alternate embodiments, custom circuits may execute all or a portion of such functions.

A biometric data store 112 may store biometric ID data for access by section 118 to compare against sensed biometric values. In one embodiment, a biometric data store 112 may include nonvolatile memory circuits for retaining such values in absence of power to a device.

In this way, a device may generate sensed biometric values in response to two dimensional features of body portion placed on a sense surface, and compare such values to stored biometric data values.

Figure 2:
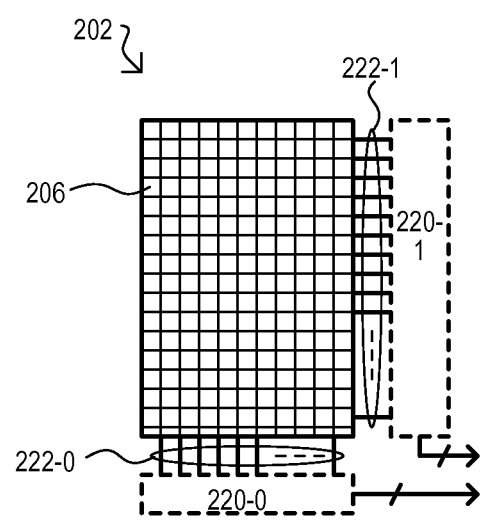
FIG. 2 is a block diagram of a sense surface that may be included in embodiments.

Referring now to FIG. 2, a sense surface that may be included in embodiments is shown in a top plan view and designated by the reference character 202. A sense surface may utilize capacitance sensing to determine contact of a body portion with the surface, and may be one particular example of that shown as 102 in FIG. 1.

In the embodiment shown, a sense surface 202 may include sense locations (one shown as 206) arranged in an orthogonal array. Each sense location (e.g., 206) may be formed by a discrete sense element (e.g., conductive element at sense location), or a combination of elements (y-direction element and x-direction elements at each location). Capacitance sense elements may be formed from any suitable conductive material, including metals and metal alloys. However, in particular touchscreen embodiments (e.g., those with combination touch detection/display functions), sense elements may be formed from a transparent conductive material, such as indium tin oxide (ITO), as but one example. In the embodiment shown, a capacitance value at a sense location (e.g., 206) may be acquired via array connections 222-0 and 222-1.

A sense surface 202 may provide direct connections to sense elements to enable direct access to sense locations (e.g., 206). However, a sense surface may optionally include decoding circuits (220-0 and -1) for selectively accessing sense locations (e.g., 206).

In this way, capacitance sensing may be used to acquire two dimensional biometric data based on features of body portion placed on a sense surface.

Figure 3:
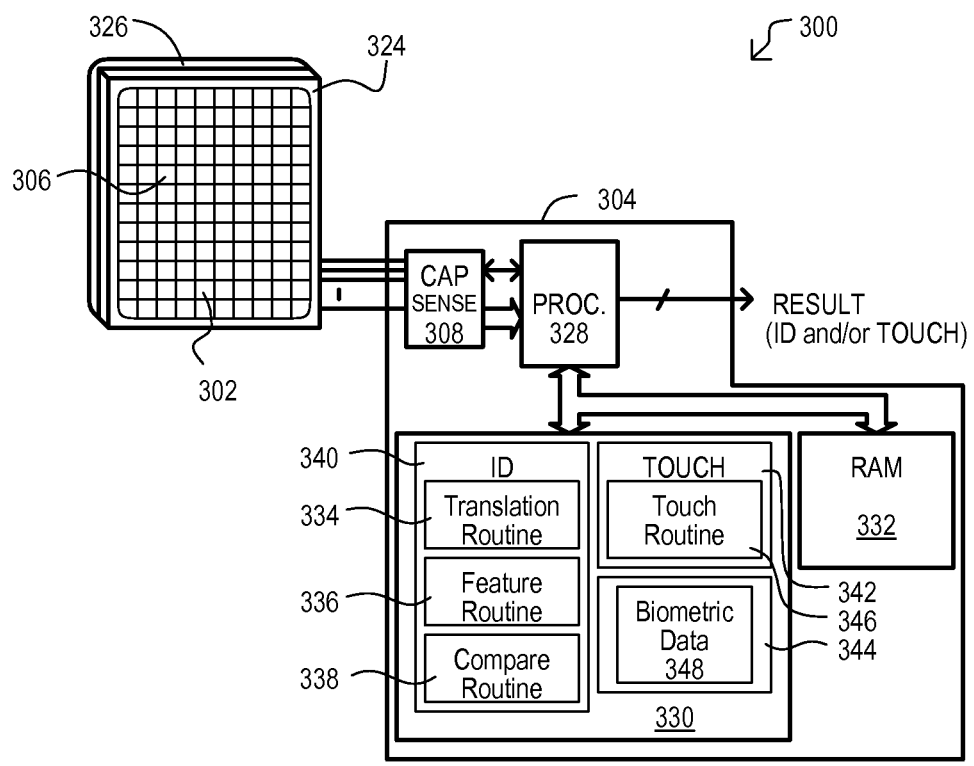
FIG. 3 is a block diagram of a device according to another embodiment.

Referring to FIG. 3, a device according to another embodiment is shown in a block diagram and designated by the general reference character 300. In a particular embodiment, device 300 may be one implementation of that shown in FIG. 1.

A device 300 may include a touchscreen 324 and processing circuits 304. A touchscreen 324 may include a sense surface 302 formed over a display 326. A sense surface 302 may take the form of those described herein, or equivalents, but include transparent sensor elements to ensure that display 326 may be observed through the touch surface 302. A display 326 may be any type of display for the device application, and may include, without limitation, a liquid crystal display (LCD), light emitting diode (LED) display (including organic LED (OLED) displays), or electrophoretic (or other so-called electronic ink type) displays.

A touchscreen 324 may provide a biometric input, a user input, and a user output. A biometric input may convey sense values corresponding to a body portion shape according to techniques described herein, and equivalents. A user input may convey touch locations and/or touch types generated by a user touching touch surface 302. In particular embodiments, sense values for both types of inputs (e.g., biometric ID and touch detection) may be generated in the same fashion (i.e., scanning sense locations). A user output of touchscreen 324 may be provided by display 326 presenting visual images. In particular embodiments, touch inputs in combination with a display may create a user interface for the device.

In the embodiment of FIG. 3, processing circuits 304 may perform multiple functions, including a biometric ID function and a user input function. In a biometric ID function, processing circuits 304 may determine if values generated from a sensed body part match stored biometric ID values. In a user input function, processing circuits 304 may derive locations of one or more touches, so that such touches may be interpreted as user inputs. A user input function may distinguish types of touches as well. For example, touch speeds and/or directions may be evaluated to detect particular types of touch events (e.g., taps, motions).

In the particular embodiment shown, processing circuits 304 may include sense circuit 308, a processor section 328, first memory 330, and a second memory 332.

Sense circuits 308 may operate as described for item 108 in FIG. 1, or in an equivalent manner.

A processor section 328 may include one or more processors that execute predetermined instructions located within a first memory 330. A processor section 310 may generate output signals RESULT, which may vary according to mode. More particularly, in an ID mode, output signals RESULT may indicate whether or not a sensed body portion is considered to match stored biometric ID data. In contrast, in a touch mode, output signals RESULT may identify location and/or type of touch on a sense surface 302.

A first memory 330 may be a substantially nonvolatile memory that stores instructions for execution by a processor section 310, as well as data for use by processor section 310. In the particular embodiment shown, first memory 330 may be divided into ID instructions 340, touch instructions 342, and data storage 344.

ID instructions 340 may include a translation routine 334, a feature routine 336, and a compare routine 338. A translation routine 334, feature routine 336 and compare routine 338 may execute the same or equivalent operations described for position translation section 114, feature derivation section 116, and feature comparison section 118, respectively, of FIG. 1. Still further, translation and feature routines 334/336 may be portions of one analysis routine. In a very particular embodiment, such routines may be firmware for one or more integrated circuit devices.

Sense instructions 342 may include a touch routine 346 that derives position data for touches and/or interprets types of touches. In one embodiment this may include determining the presence of multiple touch locations (e.g., multi-touch input).

Data storage 344 may store biometric data 348 for use by processing section 328 when executing a compare routine 338, to determine if a sensed body portion is determined to match biometric data 348. It is understood that a "match" is not an exact match, and may include tolerance limits.

A second memory 332 may store values sensed from touchscreen 324 for manipulation by processor section 328. In a particular embodiment, a second memory 332 may be substantially volatile, losing data in the absence of power.

In one very particular embodiment, processing circuits 304 may be formed all, or in part by a programmable embedded system-on-chip from the PSoC® family of integrated circuit devices, manufactured by Cypress Semiconductor Corporation, of San Jose, Calif., U.S.A.

While the embodiment of FIG. 3 shows routines stored in a nonvolatile memory, alternate embodiments, may include loaded such routines into an operational memory from some other location of a larger system incorporating device 300.

In this way, a device may include a touchscreen which operates a biometric data input in one mode, and user control input in another mode.

Figure 4:
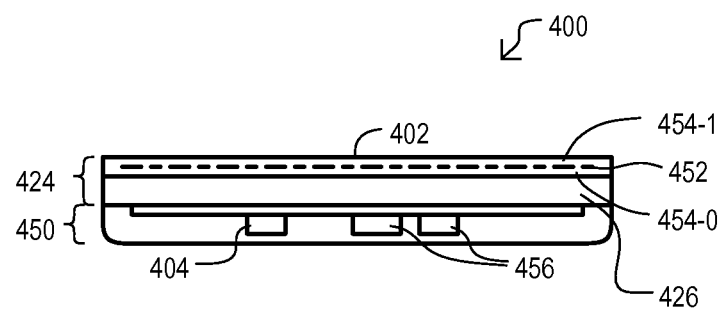
FIG. 4 is a side cross sectional view of a touchscreen device according to a further embodiment.

Referring to FIG. 4, a device according an embodiment is shown in a side cross sectional view, and designated by the general reference character 400. A device 400 may be one very particular implementation of that shown in FIG. 3.

A device 400 may be conceptualized as including a touchscreen 424 and a circuit portion 450. A touchscreen 424 may include a display 426 and a sensor array 452. A sensor array 452 may be formed over display 426 and separated therefrom by a first transparent layer 454-0. A second transparent layer 454-1 may be formed over sensor array 452 to form a sense surface 402.

A circuit portion 450 may be formed opposite to an image presenting side of display 426. A circuit portion 450 may include processing circuits 404 that may perform biometric ID functions, as well as user input functions, as described herein and equivalents. A circuit portion 450 may include additional circuits 456 for controlling a display function of display 426 and run other applications for the device 400.

In this way, processing circuits that perform biometric ID functions may be integrated into a touchscreen device.

Figure 5:
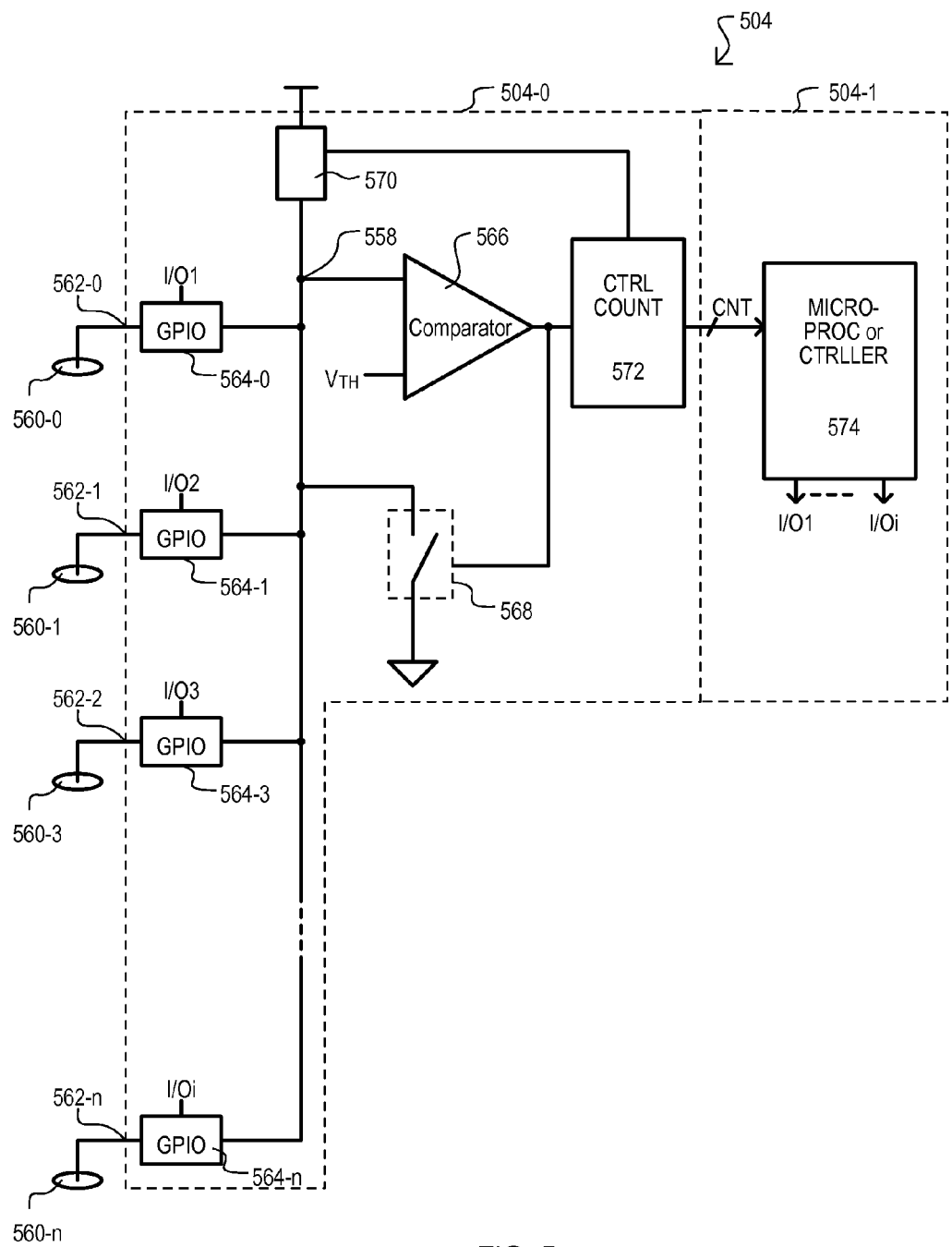
FIG. 5 is a schematic diagram showing one example of processing circuits that may be included in embodiments.

Referring now to FIG. 5, one example of processing circuits 504 that may be included in embodiments is shown in a schematic diagram. Processing circuits 504 may be formed in a same IC, and may include an analog portion 504-0 and a digital portion 504-1. An analog portion 504-0 may connect to a number of sense elements 560-0 to -n at input/outputs (I/Os) 562-0 to -n. I/Os (562-0 to -n) may be connected to a same sample node 558 by corresponding switches 564-0 to -n. Such an arrangement may enable sense elements (560-0 to -n) to be sequentially connected to sample node 558 for a capacitance measurement. Sequential sampling may provide for lower power consumption and fewer processing circuits than approaches that process signals in parallel.

An analog portion 504-0 may also include a comparator 566, a discharge switch 568, a charge switch 570, and a control and count circuit 572. In combination, these circuit elements may generate a count value representative of a sense element value (e.g., capacitance) sensed at sample node 558. Such a sensing operation may be according to integration techniques, successive approximation techniques, sigma-delta conversion, or any other suitable technique for measuring a signal at sample node 558. Thus, an analog portion 504-0 may include analog-to-digital conversion circuits that generate a digital value (counts) from an analog value (raw value detected at sample node 558).

Referring still to FIG. 5, a digital portion 504-1 may include a microcontroller 574. A microcontroller 574 may execute predetermined operations on received count values to perform a biometric compare operation and/or determine the position of such objects.

Having described various devices that may generate two dimensional data on body portions, particular data acquisition and processing operations will now be described.

Figure 6:
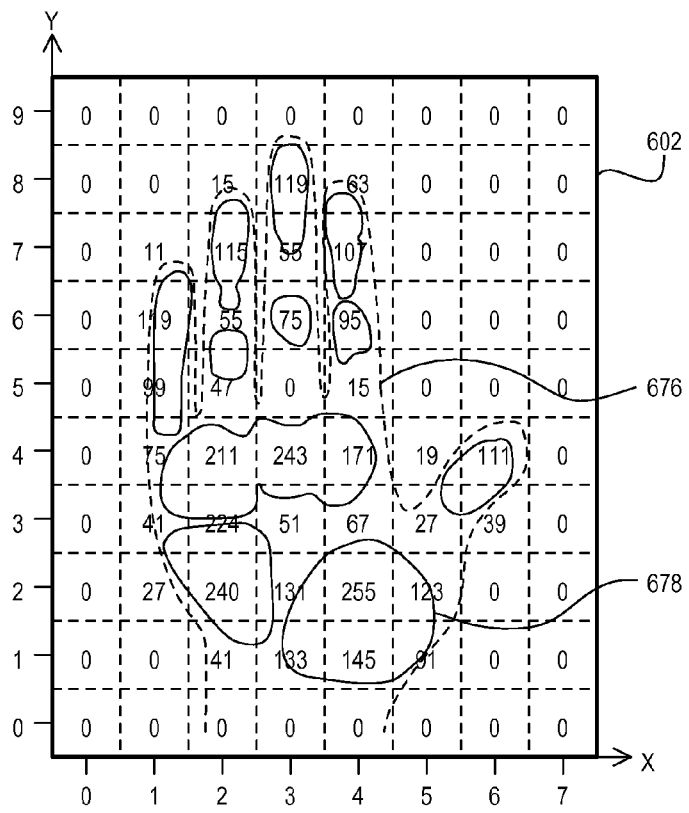
FIGS. 6 to 8 show sense value acquisition operations according to various embodiments.

Referring to FIG. 6, acquisition of sense values according to one particular embodiment is shown in a top plan view. FIG. 6 shows a sense surface 602 divided into sense locations identifiable by X and Y locations (shown by X and Y axes). FIG. 6 also shows a body part position 676 (in this example a hand shown by a dashed line) above a sense surface 602, as well as body part touch locations (solid lines, one shown as 678) showing where a body part portion contacts the sense surface 602. In the embodiment shown, it is assumed that one is instructed to keep their fingers together when sense data is being acquired.

FIG. 6 shows count values that may be acquired according to one very particular embodiment. For example, sense location (3,1) (x, y coordinates) has a count value of "133", while sense location (4,2) has a count value of "255". In the very particular embodiment shown, a count value may correspond to the amount by which a sense location is physically contacted by a body part.

Figure 7:
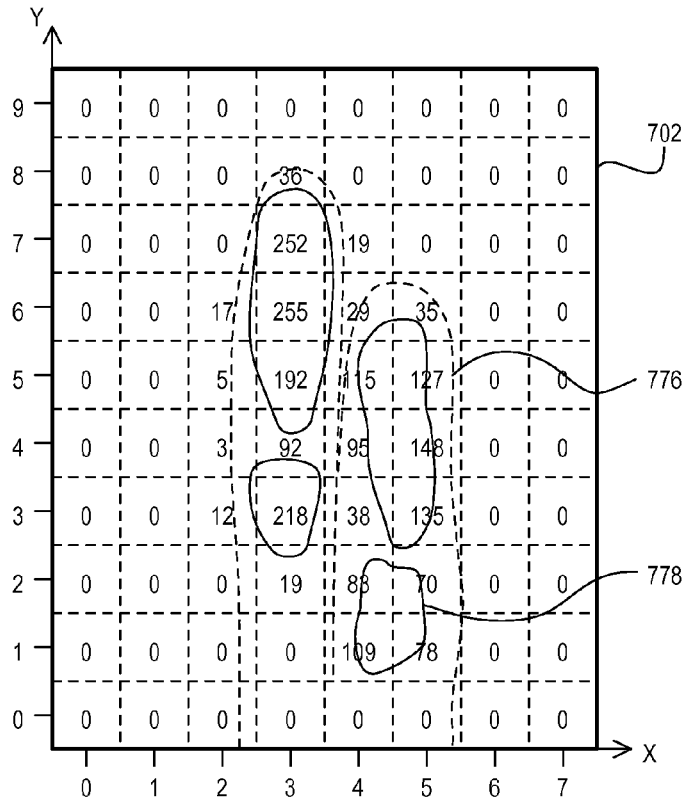

Referring to FIG. 7, a sense operation like that of FIG. 6 is shown in a top plan view, but with a sense surface 702 of finer resolution that acquires sense values for two fingers. As in the case of FIG. 6, FIG. 7 shows a sense surface 702 divided into sense locations identifiable by X and Y locations, with body part position 776 above a sense surface 702, as well as body part touch locations (one shown as 778). Corresponding count values are shown in sense locations (e.g., sense location (3,6) has a count value of "255").

Figure 8:
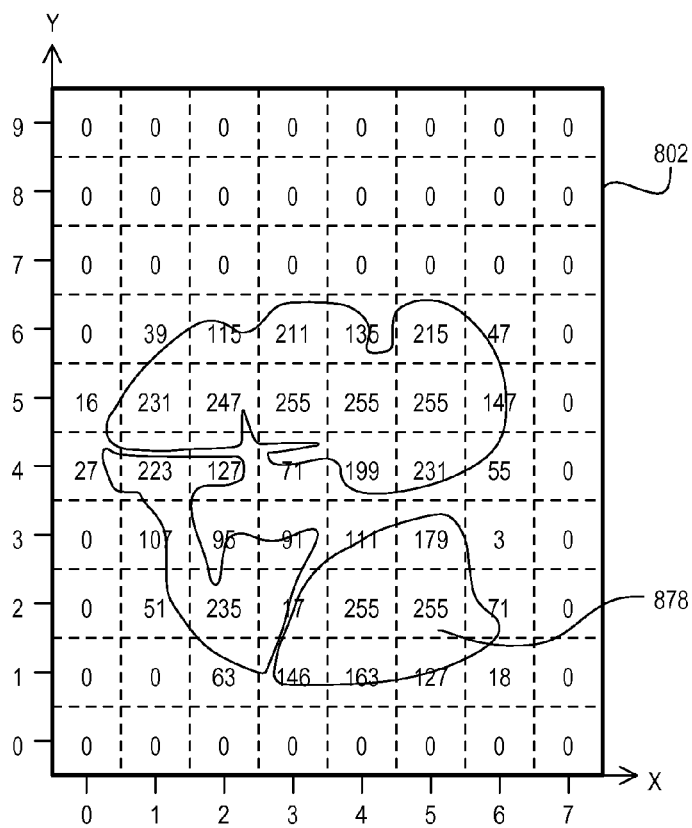

Referring now to FIG. 8, another sense operation like that of FIG. 8 is shown, but with a sense surface 802 acquiring sense values for a palm. FIG. 8 only shows body part touch locations (one shown as 878). Corresponding count values are shown in the same manner as FIGS. 6 and 7 (e.g., sense location (4,2) has a count value of "255").

In this way, embodiments may generate count values based on the amount by which body portion(s) contact sense locations on a sense surface. Such count value may be used to generate biometric data.

Once sense values for a body portion are acquired, two dimensional features may be generated from such values. Very particular examples of how such features may be generated will now be described. It is noted that the examples are understood to illustrative and any suitable biometric value generation method may be utilized and/or varied according to the body portion to be sensed, the type of sensor used, type of biometric data measured, and resources of the sensing system.

Figure 9:
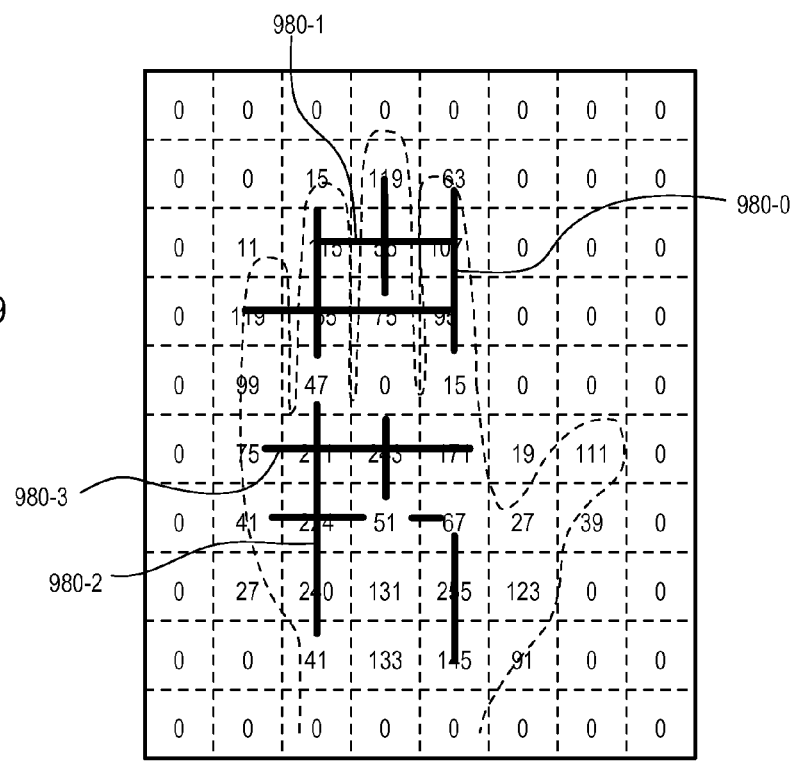
FIGS. 9 to 11 show feature extraction operations according to various embodiments.

Referring to FIG. 9, measurement values according to one particular embodiment are shown in a top plan view. FIG. 9 shows values that may be generated in response to sense values shown in FIG. 6. Such measurement values may include any of: finger length measurements (one shown as 980-0), finger width measurements (one shown as 980-1, and in this embodiment a width of multiple fingers), palm length measurements (one shown as 980-2), or palm width measurements (one shown as 980-3).

Measurements may be made according to various methods. As but one example, a total body portion region may be detected by peripheral sense locations having values over a predetermined threshold. Minimum (and/or maximum) values, or differences in such values, may designate start and ending of a measurement region. A measurement value for a measurement region may then vary according to the values at sense locations within the measured region and/or adjacent to such a region.

Figure 10:
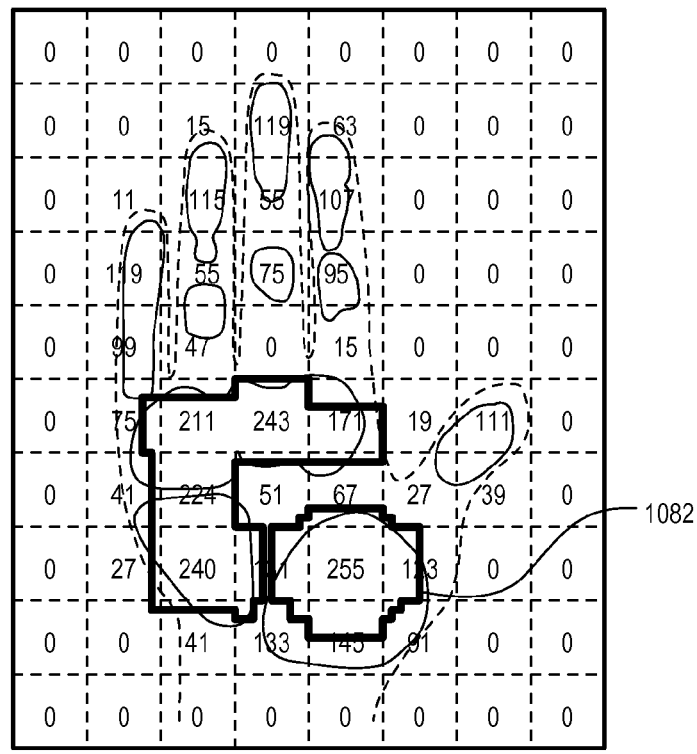

Referring to FIG. 10, measurement values according to another particular embodiment are shown in a top plan view. FIG. 10 shows values that may be generated in response to sense values shown in FIG. 6. Such measurement values may include shapes of a palm (one shown as 1082).

Measurements may be made according to various methods. In one very particular embodiment, a palm region may be derived from a total body region by detecting minimum corresponding to gaps between finger and palm regions. Contiguous sense locations above a threshold may be considered to belong to a same palm portion. Such areas may be increased or decreased based on values of bordering sense locations.

Figure 11:
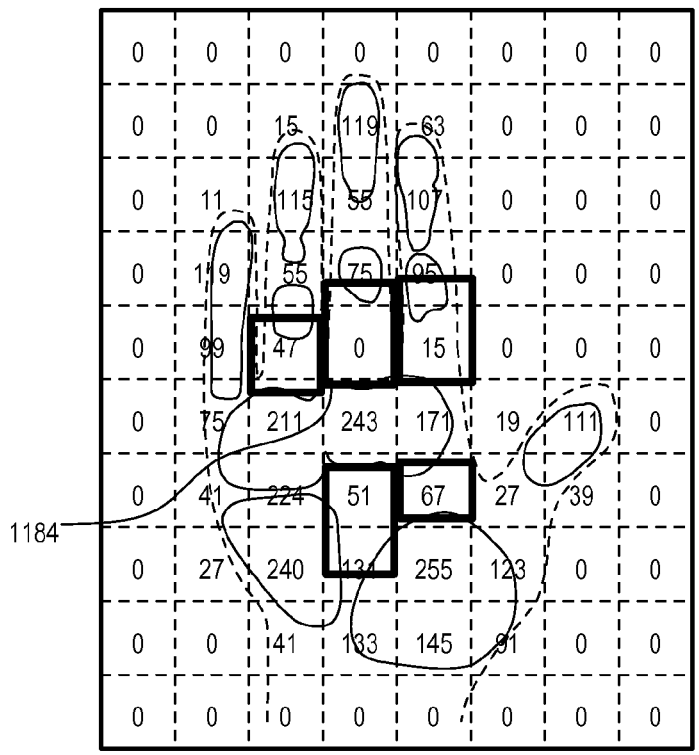

Referring to FIG. 11, measurement values according to a further particular embodiment are shown in a top plan view. FIG. 11 also shows values that may be generated in response to sense values shown in FIG. 6. Such measurement values may include shapes of touch gaps (one shown as 1184) arising between areas where a body portion contacts a sense surface Measurements may be made according to various methods. In one particular embodiment, gaps locations derived from minimum values within a contact region. Contiguous sense values below a threshold may be considered to belong to a same gap. Gap areas may be increased or decreased based on values of bordering sense locations.

As noted above, and repeated here, the described measurement approach is but one example of possible measurement approaches.

To ensure consistent measurement of biometric values, a device may compensate for difference in orientation between the position of a sensed body portion, and the position of a body portion used to derive a biometric reference value. One particular compensation approach that may be included in the embodiments is shown in FIG. 12

Referring to FIG. 12, measurement values are shown in a top plan view for hand like that of FIG. 6. However, the hand is rotated and offset with respect to an orientation like that of FIG. 6.

Compensation for such rotation and offset may be made according to various methods. In one particular embodiment, features of the scanned body part may be identified to derive the orientation of the body part. In the particular embodiment of FIG. 12, feature points may be identified (e.g., largest positive Y location 1286-0, a minimum value surrounded by large values 1286-1) to derive an angular offset 1288. In addition, one feature point location (e.g., 1286-1) may be compared to a reference point 1290 to determine a position offset.

Such offset values may then be utilized to generate sense values and biometric features.

In alternate embodiments, measurement of biometric features may be derived with reference to feature points (e.g., 1286-0/1). That is, compensation and calculation are part of a same operation.

Alternate embodiments may use any suitable compensation steps, according to various factors, including but not limited to: available processing powers, desired speed of result, amount of offset expected.

A device that acquires biometric data and may also serve as a user touch input device may be included in various types of systems to provide both security and touch input information to a host device. Particular system embodiments will now be described. It is stressed that such embodiments are intended to be illustrative, and not exhaustive.

Referring to FIG. 13 a system according to an embodiment is shown in a block schematic diagram and designated by the general reference character 1392. A system 1392 may be a computing device including, but not limited to, desktop computing devices as well as portable computing devices, such as handheld electronic devices. A system 1392 may include a detection device 1300 and a computing section 1394.

A detection device 1300 may correspond to any of the devices described herein, or equivalents, and may operate in an ID mode to make a biometric reading of a body portion, and in a touch mode to provide user input values to the system.

A computing section 1394 may be conceptualized as having a number of operational layers, including a security section 1395, user interface 1396 and a main program layer 1398. Security section 1395 may prevent access to some or all of the functions of system 1392 according to biometric match results from device 1300.

User interface software 1396 may accept touch position and/or type data from device. In some embodiments, user interface software 1396 may generate interrupts to notify when input events occur based on the detection and/or movement of a detected option. Alternatively, position information may be periodically polled.

A main programming layer 1398 may include an operation system (OS) as one or more application programs (APP) for executing functions in response to inputs from detection device 1300. A computing section 1394 may physically be implemented by one or more processors that execute predetermined instructions stored in a memory.

It is noted that in an embodiment like that of FIG. 13, a computing section 1394 may receive input values from other devices and/or interfaces in conjunction with those from detection device 1300.

Referring to FIG. 14, a very particular system embodiment is shown in a front plan view and designated by the reference character 1492. A system 1492 may be a display device, and may be one implementation of that shown in FIG. 13.

A system host 1494 may include a display device for presenting an image, including viewing images and/or a graphical user interface. Such a system 1492 may include, without limitations, stand alone computer displays, computers with integrated displays, televisions, or electronic picture frames, to name just a few.

In the particular embodiment shown, a display surface may be a touchscreen 1424. Such a touchscreen 1424 may serve to acquire biometric data in one mode, and user control touch inputs in another mode. Sense surface 1402 may take the form of any of those shown herein, and equivalents. Sense surface 1402 may be connected to processing circuits (not shown), to execute biometric and touch position operations according to the embodiments herein, and equivalents.

Figure 15:
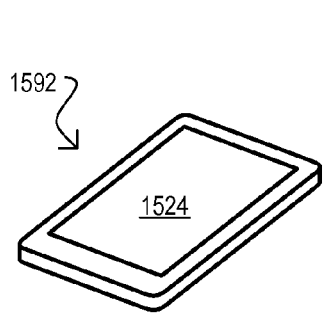

Referring to FIG. 15, another particular embodiment is shown in a perspective view and designated by the reference character 1592. A system 1592 may be a one implementation of that shown in FIG. 13.

A system 1592 may be a portable electronic device, and may include without limitations, a cellular phone, personal digital assistant, personal media player, personal gaming device, or tablet computer, to name but a few. As in the case of FIG. 15, system 1592 may include a touchscreen 1524 having biometric ID and touch input capabilities. A sense surface of touchscreen 1524 may take the form of any of those shown herein, and equivalents.

Figure 16:
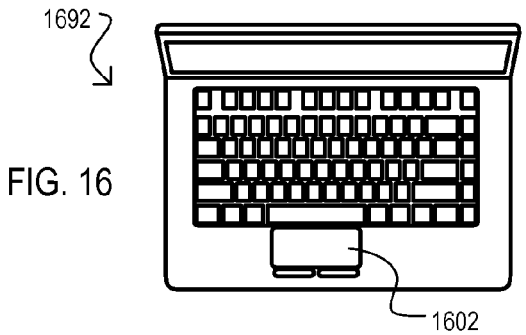

Referring to FIG. 16, a further embodiment is shown in a top plan view and designated by the reference character 1692. A system 1692 may be an implementation of that shown in FIG. 13.

A system 1692 may include a portable "laptop" type computer. System 1692 may include have a touch pad that serves as a touch surface 1602 for a device having biometric and touch input capabilities, as described herein, and equivalents.

Figure 17:
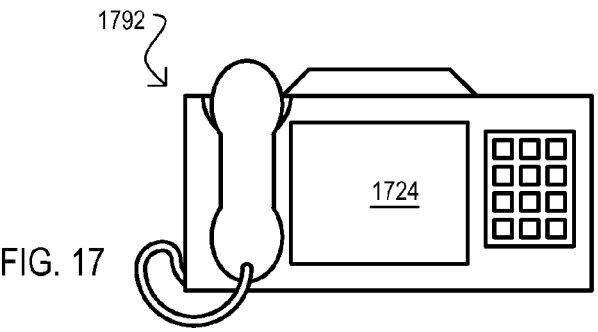

Referring to FIG. 17, another embodiment is shown in a front plan view and designated by the reference character 1792. A system 1792 may be a one implementation of that shown in FIG. 13.

A system 1792 may include a network phone, such as an Internet telephony device (e.g., voice-over-Internet-protocol (VoIP) phone). System 1792 may include a touchscreen 1724 biometric and touch input capabilities, as described herein, and equivalents.

Having described various systems, operations of a system will now be described with reference to FIGS. 18A to 18E. FIGS. 18A to 18E show a system 1892 having a touchscreen 1824 according to embodiments described herein, and equivalents.

Figure 18A:
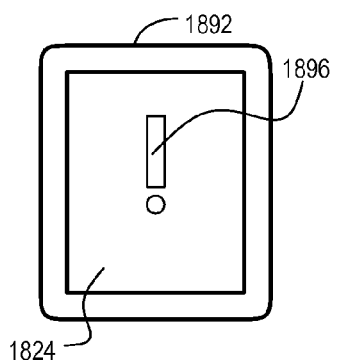
FIGS. 18A to 18E are a sequence of diagrams showing system operations according to one particular embodiment.

Referring to FIG. 18A, in response to a predetermined event (e.g., start-up, user logout, etc.) a touchscreen 1824 may display an initial message 1896 that a device may not be accessed without a security procedure.

Figure 18B:
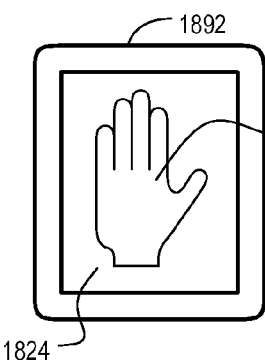

Referring to FIG. 18B, to initiate a security procedure, a touchscreen 1892 may display a request 1898 for the placement of a body portion on a touchscreen 1824.

Figure 18C:
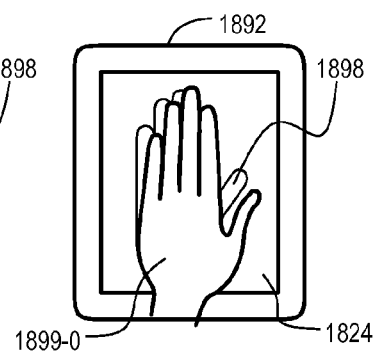

Referring to FIG. 18C, a user may place a body portion (in this case a hand) on a sense surface of touchscreen 1824. In response to contact with a body portion, a system 1824 may begin acquiring sense data and make biometric measurements as described herein, and equivalents.

Figure 18D:
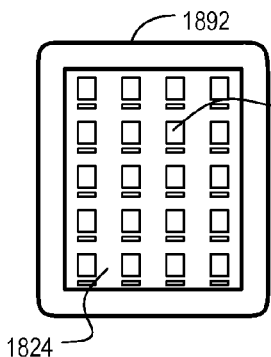

Referring to FIG. 18D, if a body portion matches a stored biometric profile, a system 1892 may enable access by a user presenting an interface screen 1897 (i.e., the system 1892 may be unlocked). In addition, a touchscreen 1824 may switch to a user input mode, to enable interaction with elements (e.g., icons) of an interface screen 1897. If a body portion does not match a stored profile, a system 1892 may continue to request placement of a body portion on the screen.

Figure 18E:
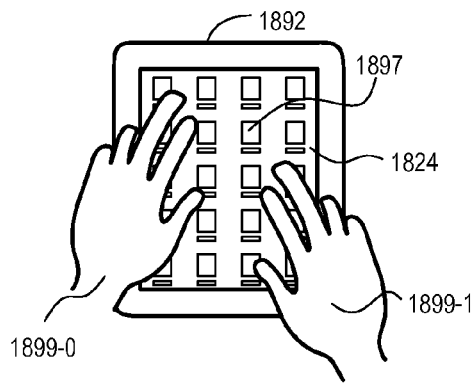

Referring to FIG. 18E, with system 1892 unlocked, a user may interact with the system with touches on touchscreen 1824.

In this way, a system may request a user to contact a sense surface with a body portion for a biometric measurement to enable access to the system, including user control inputs through the sense surface.

While embodiments may include sense devices and systems, other embodiments may include methods of making biometric measurements as described in above embodiments. Additional method embodiments will now be described below.

Figure 19:
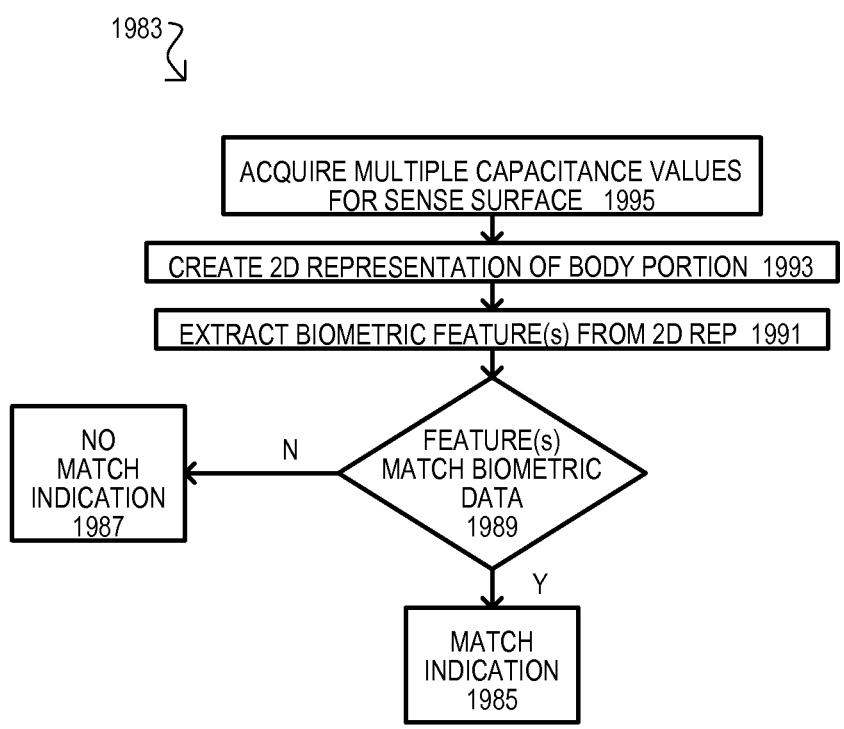
FIG. 19 is a flow diagram of a method according to an embodiment.

Referring to FIG. 19, a method according to a first embodiment is shown in a flow diagram and designated by the general reference character 1983. A method 1983 may include acquiring capacitance values for a sense surface (box 1995). A two dimensional representation of a body portion may then be made (box 1993). Biometric features may then be extracted from such a two dimensional representation (box 1991).

Referring still to FIG. 19, extracted biometric features may then be checked to see if they match biometric data (box 1989). If no match is found (N from 1989), a no match indication may be generated (box 1987). In contrast, if a match is found (Y from 1989), a match indication may be generated (box 1985).

Figure 20:
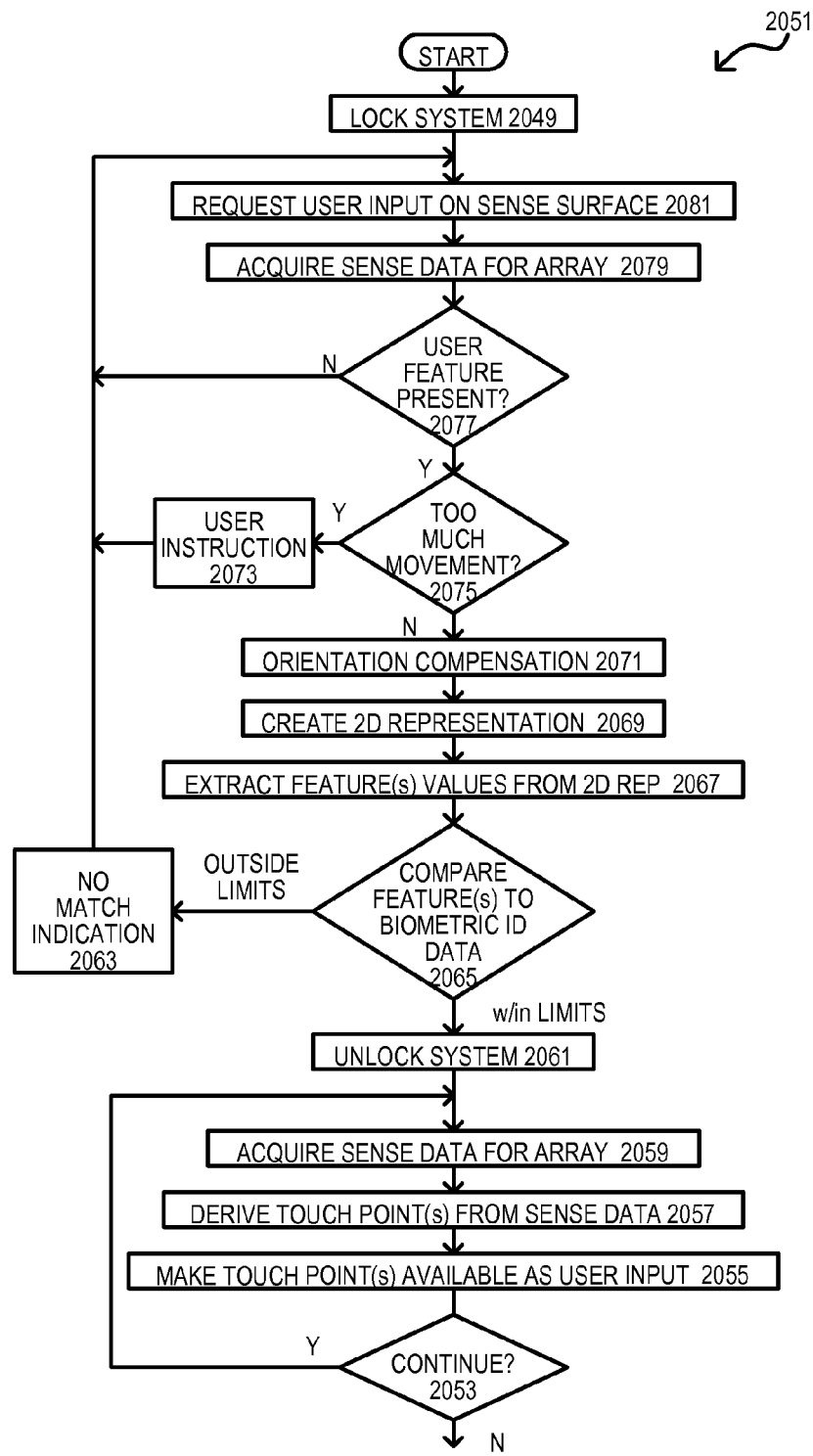
FIG. 20 is a flow diagram of a method according to a further embodiment.

Referring to FIG. 20, a method according to another embodiment is shown in a flow diagram and designated by the general reference character 2051.

A method 2051 may include locking a system (box 2049). Such an action may prevent all or a portion of system features to be inaccessible by a user. A user input on a sense surface may be requested (box 2081). Such an action may include prompting a user to place a body portion on a sense surface. In very particular touchscreen embodiments, such an action may include displaying images to assist in properly aligning the body portion on the touchscreen. Sense data may then be acquired (box 2079).

A method 2051 may check to determine if a user feature is present (box 2077). Such an action may help avoid executing biometric analyses while a user is only providing finger touch inputs and/or a user has less than all of a requested body portion on a sense surface. In particular embodiments, such an action may make an initial determination that touches have been sensed on a minimum number of sense locations, or minimum number of consecutive sense locations.

If a user feature is not present (N from box 2077), a method 2051 may again request user input (return to box 2081). If a user feature is determined to be present (Y from box 2077), a method 2051 may check for too much movement by a user (box 2075). Such an action may compare sequential sets of sense values acquired from a scan surface to determine if a body portion has moved. If movement is detected, and it is greater than some predetermined amount and/or rate (Y from 2075), a user may be instructed to cease movement (box 2073) and sensing operations may repeat (return to box 2081).

However, if movement is not detected (N from 2075), acquired sense values may be considered sufficient to perform a biometric analysis.

Referring still to FIG. 20, a method 2051 may compensate for the orientation of a body portion (box 2071). In particular embodiments, such an action may include compensating for angular rotation and offset from a preset measuring point, as described herein and equivalent operations. A two dimensional representation of a body portion may then be made (box 2069). Biometric features may then be extracted from such a two dimensional representation (box 2067). Extracted biometric features may then be compared to biometric ID data (box 2065). If extracted biometric features are outside of limits (OUTSIDE LIMITS from 2065), a no match indication may be generated (box 2063) and a system may remain locked. In the particular embodiment shown, a method 2051 may return to requesting user input (box 2081).

If extracted biometric features are within limits (w/in LIMITS from 2065), a system may be unlocked (box 2061), allowing a user to access previously locked functions. Further, different features may be unlocked depending upon the ID match that has occurred. Such a function may allow different users to log into personal accounts on a device based on an ID match.

In the particular embodiment of FIG. 20, once unlocked, a method 2051 may switch to a touch sensing mode. Once again, sense data may be acquired (box 2059). However, rather than execute biometric analysis (or check for suitability for biometric analysis), a method 2051 may derive touch points from sense data (box 2057). Such an action may include generating position values for finger touches (and/or types of touches). Touch point data may be made available as a user input (box 2055). A method 2051 may remain in the touch sensing mode (Y from 2053), or may move onto other actions (N from 2053).

It should be appreciated that in the foregoing description of exemplary embodiments, various features are sometimes grouped together in a single embodiment, figure, or description thereof for the purpose of streamlining the disclosure aiding in the understanding of one or more of the various aspects. This method of disclosure, however, is not to be interpreted as reflecting an intention that the claimed invention requires more features than are expressly recited in each claim. Rather, as the following claims reflect, inventive aspects lie in less than all features of a single foregoing disclosed embodiment. Thus, the claims following the detailed description are hereby expressly incorporated into this detailed description, with each claim standing on its own as a separate embodiment of this invention.

It is also understood that the embodiments of the invention may be practiced in the absence of an element and/or step not specifically disclosed. That is, an inventive feature of the invention may be elimination of an element.

Accordingly, while the various aspects of the particular embodiments set forth herein have been described in detail, the present invention could be subject to various changes, substitutions, and alterations without departing from the spirit and scope of the invention.

What is claimed is:

1. A device, comprising:
   a sense circuit coupled to a capacitance sense array having a plurality of capacitance sense elements of a sense surface, the sense circuit configured to detect a human hand on or proximate to the sense surface; and
   a processing section coupled to the sense circuit, the processing section configured to:
   receive sense values of the plurality of capacitance sense elements from the sense circuit;
   create a two-dimensional representation of the human hand from the sense values, wherein the two-dimensional representation includes measurement values derived from the sense values;

extract biometric features of the human hand from the two-dimensional representation of the human hand, wherein to extract the biometric features the processing section is configured at least to:
  determine the extracted biometric features, wherein the extracted biometric features include a dimension associated with a particular portion of the human hand, wherein the dimension is determined based on a measurement region designated by two or more of the measurement values that are included in the two-dimensional representation of the human hand and that identify the particular portion of the human hand, the two or more of the measurement values that designate the measurement region being over a predetermined threshold that is a non-zero value, and wherein the particular portion of the human hand includes one of a finger, a palm, and a gap between locations where portions of the human hand contact the sense surface; and
  compare the extracted biometric features to stored biometric features to determine a match.

2. The device of claim 1, wherein the dimension includes at least one of: a length of at least one finger, a width of at least one finger, a shape of at least a portion of a palm, and dimensions of gaps between where portions of the human hand contact the sense surface and do not contact the sense surface.

3. The device of claim 1, further comprising an integrated circuit comprising:
  an analog section configured to sequentially acquire capacitance values at each of the plurality of sense elements and to convert the capacitance values into numerical count values, and
  a digital section with arithmetic logic circuits configured to calculate the two-dimensional representation based on at least the count values and positions of the count values.

4. The device of claim 3, wherein:
  the analog section comprises:
    inputs connected to each of the plurality of sense elements that are selectively connected to a common sense node by input switches, and
    an analog-to-digital conversion circuit that converts a value at the common node into a digital value;
  the digital section comprises a processor that executes instructions stored in an instruction memory.

5. The device of claim 1, wherein the sense surface comprises a touch display comprising an image display disposed parallel to the capacitance sense array configured to generate an image viewable through the sense surface.

6. The device of claim 5, wherein the sense surface is a touch display screen for a user device selected from: a display, personal computing device, portable computer, and Internet telephony device.

7. The device of claim 1, wherein the processing section is configured to create the two-dimensional representation of the human hand in an identification mode, and to detect at least finger touch positions as user input signals in a touch mode.

8. A method, comprising:
  acquiring capacitance values for a plurality of points on a sensor surface;
  in at least a first mode, creating a two-dimensional representation of a human hand from the capacitance values, wherein the two-dimensional representation includes measurement values derived from the capacitance values;
  extracting biometric features of the human hand from the two-dimensional representation of the human hand, wherein extracting the biometric features comprises:
    determining the biometric features, wherein the biometric features include a dimension associated with a particular portion of the human hand, wherein the dimension is determined based on a measurement region designated by two or more of the measurement values that are included in the two-dimensional representation of the human hand and that identify the particular portion of the human hand, the two or more of the measurement values that designate the measurement region being over a predetermined threshold that is a non-zero value, and wherein the particular portion of the human hand includes one of a finger, a palm, and a gap between locations where portions of the human hand contact the sensor surface; and
  comparing the extracted biometric features to stored biometric data to generate a match determination.

9. The method of claim 8, wherein acquiring the capacitance values comprises acquiring a capacitance value from an array of capacitance sense elements.

10. The method of claim 8, wherein:
  acquiring the capacitance values comprises generating a count value corresponding to each sensed capacitance; and
  creating the two-dimensional representation comprises generating the measurement values based on the count values.

11. The method of claim 8, wherein the dimension includes a value corresponding to any of: finger length, finger width, shape of a palm, and shapes of gaps between one or more portions of the human hand that contact the sense surface and other one or more portions of the human hand that do not contact the sense surface.

12. The method of claim 8, wherein creating the two-dimensional representation comprises determining at least an angular offset of the particular portion of the human hand with respect to a position corresponding to the biometric data, and wherein the method further comprises compensating for the angular offset.

13. The method of claim 8, further comprising, in at least a second mode, generating at least finger touch positions as user input signals in response to the capacitance values.

14. The method of claim 13, wherein the sensor surface is a surface of a touch screen and wherein the method further comprises correlating finger touch locations with display portions of the touch screen.

15. The method of claim 8, further comprising, in the first mode, providing a prompt to place a portion of a hand on the sensor surface.

16. A system, comprising:
  a touch surface having a plurality of capacitance sense elements; and
  processing circuits operable in (1) a touch mode to detect touches as user input values, and (2) a biometric identification mode to detect biometric features of a user hand and to compare the biometric features to stored biometric identification values, wherein to detect the biometric features the processing circuits are configured at least to:
    create a two-dimensional representation of the user hand, wherein the two-dimensional representation includes measurement values; and
    extract the biometric features of the user hand from the two-dimensional representation of the user hand by at least determining a dimension associated with a particular portion of the user hand, wherein the dimension is determined based on a measurement region designated by two or more of the measurement values that are included in the two-dimensional representation of the user hand and that identify the particular portion of the user hand, the two or more of the measurement values that designate the measurement region being over a predetermined threshold that is a non-zero value, and wherein the particular portion of the user hand includes one of a finger, a palm, and a gap between locations where portions of the user hand contact the touch surface;

wherein the processing circuits are further configured to compare the extracted biometric features to the stored biometric identification values to determine a match.

17. The system of claim 16, wherein the touch surface is the surface of touchscreen of an electronic device.

18. The system of claim 16, wherein the processing circuits comprise:
   an analog portion comprising:
      inputs connected to each of the plurality of capacitance sense elements, the plurality of capacitance sense elements being selectively connected to a common sense node by input switches, and
      an analog-to-digital conversion circuit to convert a value at the common node into a digital value; and
   a digital portion comprising at least one processor that executes instructions stored in an instruction memory.

19. The system of claim 16, wherein the touch surface has an area sufficient to enable the processing circuits to detect the biometric features of the particular portion of the user hand without moving the particular portion of the user hand.

* * * * *